United States Patent [19]

O'Dell

[11] 4,338,105
[45] Jul. 6, 1982

[54] BEARING FOR FILTER BAG SUPPORT ARRANGEMENT

[75] Inventor: Leonard J. O'Dell, Louisville, Ky.

[73] Assignee: Allis-Chalmers Corporation, Milwaukee, Wis.

[21] Appl. No.: 290,356

[22] Filed: Aug. 5, 1981

[51] Int. Cl.³ .............................................. B01D 46/04
[52] U.S. Cl. ................................ 55/304; 55/341 NT; 308/2 R
[58] Field of Search .................. 55/300, 304, 341 NT; 308/2 R

[56] References Cited

U.S. PATENT DOCUMENTS

| | | | |
|---|---|---|---|
| 1,699,578 | 1/1929 | Bates | 308/2 R |
| 2,143,664 | 1/1939 | Snyder | 55/304 |
| 3,041,808 | 7/1962 | Snyder | 55/304 |
| 3,413,044 | 11/1968 | Weickhardt | 308/2 R |
| 3,955,947 | 5/1976 | Hoon et al. | 55/300 |

*Primary Examiner*—Kathleen J. Prunner
*Attorney, Agent, or Firm*—Thomas G. Anderson

[57] ABSTRACT

A bearing assembly for supporting one end of a shaker shaft from which a plurality of filter bags are suspended in a baghouse. The bearing assembly includes a stationary bracket mounted within the gas cleaning chamber of the baghouse, a supporting member having an upwardly extending knife-edge portion generally aligned with the longitudinal axis of the shaft and pivotally connected to the bracket for movement about a horizontal axis extending perpendicular to the axis of the shaft, and a shaft supporting block affixed to the end of the shaft having an inverted V-shaped notch sized to be received on the knife-edge portion to support the shaft in a manner accommodating axial and angular displacement of the shaft with respect to the stationary bracket of the bearing assembly.

6 Claims, 5 Drawing Figures

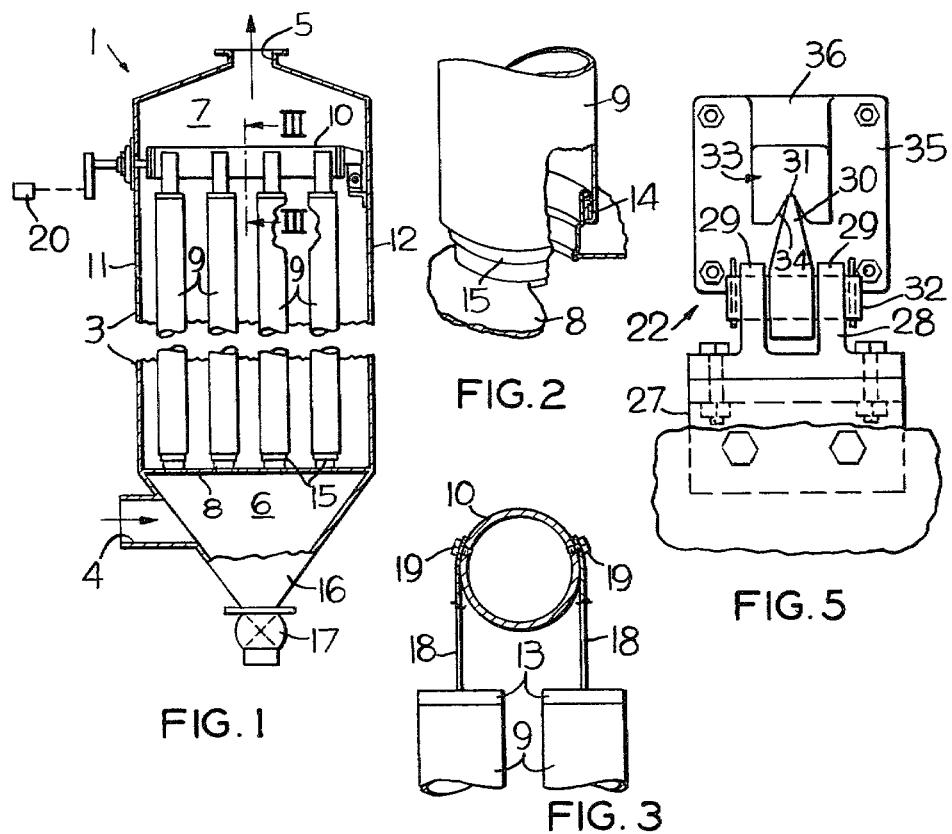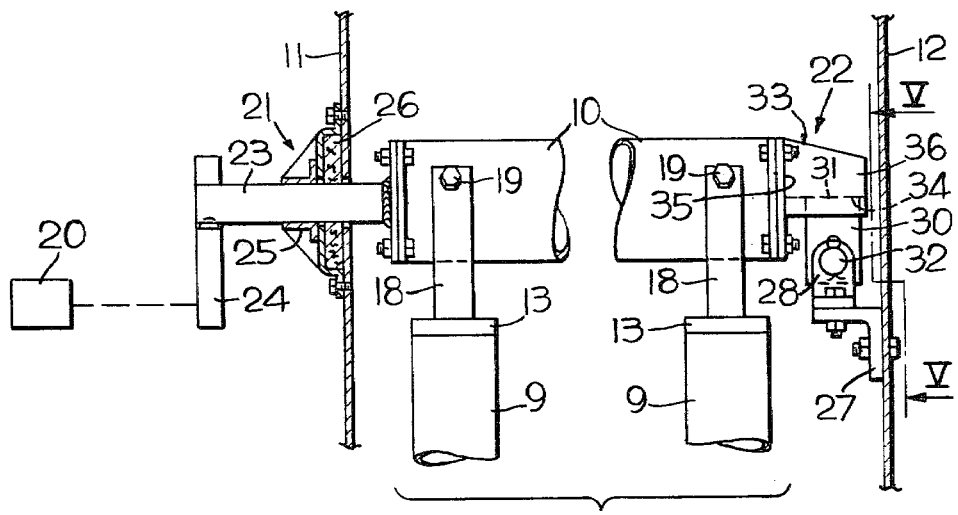

BEARING FOR FILTER BAG SUPPORT ARRANGEMENT

BACKGROUND OF THE INVENTION

1. Field of the Invention

The present invention relates to gas separation devices and in particular to a bearing in a supporting arrangement for a plurality of filter bags in a baghouse.

2. Description of the Prior Art

The prior art discloses a variety of supporting arrangements for suspending tubular filter bags within a baghouse.

Typically, the filter bags are suspended in rows from a shaker shaft or beam extending across the baghouse above each row of filter bags. This type of arrangement generally provides that the shaker shaft be periodically oscillated to shake the filter bags suspended from it, thereby dislodging particulate materials accummulating on them during filtering operations. Those materials then fall into a hopper or other receptacle at the bottom of the baghouse where they are removed from the hopper and disposed of.

Each of the shaker shafts is supported by a bearing at each of its ends which accommodates rotational oscillation of the shaft by a suitable drive mechanism connected to the shaft. While this arrangement has proven to be satisfactory for shaking the bags, experience has shown that the center of the beam tends to sag or bow downward due to the weight of the bags. As a result, relatively abrupt load concentrations tend to develop in the bearings during bag cleaning operations. This in turn has led to uneven wear and fatigue of the bearings requiring their replacement.

SUMMARY OF THE INVENTION

The present invention relates to gas cleaning devices and in particular to a self-aligning bearing for a shaker shaft in a baghouse having a plurality of vertically extending filter bags arranged in rows across the gas cleaning chamber of the baghouse.

The baghouse incorporating the invention is provided with a horizontal shaker shaft extending across the gas cleaning chamber above a row of filter bags suspended from each side of the shaft. The upper ends of the filter bags in each pair of the rows are affixed to the shaft aligned above it and the lower ends of the filter bags are secured in flow-through relation to an apertured header plate forming the lower end of the gas cleaning chamber. Each of the shaker shafts is supported by bearings carrying the ends of the shaft which are affixed to the opposing walls of the baghouse, and an oscillating drive mechanism is connected with one end of each of the shafts to impart rotational oscillation to the shafts to shake the bags during shaking or filter cleaning operations.

In order to compensate for misalignment of the shafts within the bearings due to the tendency of the shafts to sag under the weight of the filter bags, the invention provides knife-edge type bearings to carry the ends of the shafts opposite the ends connected to the drive mechanism. This accommodates axial and angular displacement of the shafts while at the same time supporting the shafts in a manner facilitating their oscillation during filter cleaning operations. Each of the knife-edge bearings includes a stationary bracket adapted to be affixed to the wall of the baghouse, a supporting member having an upwardly extending knife-edge portion pivotally connected to the stationary bracket affixed to the wall of the baghouse for movement about a horizontal axis extending perpendicular to the axis of the shafts, and a supporting block having an inverted V-shaped notch received on the knife-edge of the supporting member secured to the end of its associated shaft to support it within the cleaning chamber.

From the foregoing, it can be seen that the invention contemplates a bearing arrangement which minimizes wear and fatigue of the bearings while at the same time providing an arrangement which is relatively inexpensive and easy to fabricate. However, it is to be understood that various changes can be made in the arrangement, form and construction of the apparatus disclosed herein without departing from the spirit and scope of the invention.

DESCRIPTION OF THE DRAWINGS

FIG. 1 is a side elevational view, partially in section, showing a baghouse incorporating the bearing assembly embodying the invention;

FIG. 2 is an enlarged partial isometric view showing the coupling between the bottom of the filter bags and the apertured plate separating the dirty gas chamber and the gas cleaning chamber of the baghouse;

FIG. 3 is an enlarged partial cross-sectional view taken substantially along line III—III in FIG. 1;

FIG. 4 is an enlarged partial side elevational view of the shaker shaft shown in FIG. 1; and FIG. 5 is a partial end elevational view taken substantially along line V—V in FIG. 4.

DESCRIPTION OF THE PREFERRED EMBODIMENT

As shown in FIG. 1, a gas cleaning baghouse 1 incorporating the invention includes a housing 3 having a dirty gas inlet 4 and a clean gas outlet 5. The housing 3 is divided into a dirty gas chamber 6 and a gas cleaning chamber 7 by an apertured plate member 8 secured across the interior of the housing. As will be described, a plurality of tubular filter bags 9 are suspended in rows within the gas cleaning chamber 7 from a plurality of shaker shafts or beams 10 mounted to extend between the opposing walls 11 and 12 of the housing 3 above a row of filter bags suspended from each side of the shaft.

Each of the filter bags 9 is closed on its upper end by a cap 13 and open on its lower end which is secured to the apertured plate member 8 in flow-through communication with an associated aperture in the plate member. As shown in FIG. 2 and disclosed in detail in U.S. Pat. No. 4,003,727, the filter bags 9 are secured to the apertured plate member 8 by a flexible collar 14 formed in the lower end of each of the filter bags which secures the bag to a tubular connector 15 affixed to the plate member about its associated aperture.

During gas cleaning operations the dirty gases are directed through the inlet 4 into the dirty gas chamber 6. The dirty gases flow from the dirty gas chamber 6 into the interior of each of the filter bags 9 where they filter through the bags into the gas cleaning chamber 7 and then flow out of the baghouse through the outlet 5. As the gases flow through the filter bags 9, dust and other particulate materials are separated from the gases in the interior of the bags. These materials ultimately drop into a hopper 16 enclosing the bottom of the baghouse where they are in turn removed from the hopper through a conventional control valve 17 at the base of the hopper 16 and disposed of.

Referring to FIGS. 3 and 4, each of the filter bags 9 is suspended from its respective shaker shaft 10 by a strap or cord 18 having one end affixed to its cap 13 and its other end secured to the shaker shaft 10 by a clip or bolt 19 protruding from the shaft as is well known in the art. As shown in the drawings, the straps 18 are secured to the side of the shaker shaft 10 so that upon rotational oscillation of the shaft by an oscillating drive mechanism 20 connected to one end of the shaft (shown schematically in the drawings) the bags will be shaken to dislodge dust and other particulate materials accummulating on the interior of the bags during gas cleaning operations. As indicated above, these materials ultimately fall into the hopper 16 whereafter they are disposed of through the valve 17.

To accommodate rotational oscillation of the shaker shafts 10 during shaking operations, each of the shaker shafts is supported by a pair of bearing assemblies 21 and 22 affixed to the opposing walls of the housing to carry the ends of the shaft. One end of the shaker shaft 10 is provided with an outwardly projecting stub shaft 23 which is carried by the bearing assembly 21 and extends through it to a linkage 24 which is connected to the oscillating drive mechanism 20. The bearing assembly 21, which is secured to the outer face of the wall 11, includes a bushing 25 and suitable packing material 26 forming a relatively gas-tight seal about the stub shaft 23 where it projects through the wall of the housing. The other bearing assembly 22, which carries the other end of the shaker shaft 10, is a knife-edge type assembly fabricated from metal castings secured to the inner face of the wall 12. As shown in the drawings, the bearing assembly 22 includes an inverted L-shaped bracket 27 bolted to the inner face of the wall 12, a clevis 28 having a pair of upwardly projecting jaws 29 bolted to the bracket 27, an upwardly extending supporting member 30 having a knife-edge portion 31 aligned along the longitudinal axis of the shaft 10 and pivotally secured between the jaws 29 by a pin 32 for movement about a horizontal axis extending perpendicular to the axis of the shaft 10, and a shaft supporting block 33 having an inverted V-shaped notch 34 aligned with the longitudinal axis of the shaft 10 which receives the knife-edge portion 31 to support the shaft 10. The shaft supporting block 33 includes a vertically extending base plate 35 affixed to the end of the shaker shaft 10 and a lug 36 projecting from the base plate 35 having the notch 34 formed in it. The notch 34, whose apex is aligned with the centroidal axis of the shaft, extends along substantially the entire length of the lug 36 which is greater than the width of the knife-edge portion 31 to insure uniform engagement between the supporting member 30 and the supporting block 33 as the shaft 10 shifts about during normal shaking operations.

From the foregoing, it can be seen that the knife-edge type bearing assembly 22 compensates for the angular and axial displacement of the shaker shaft 10 resulting from it sagging under the weight of the filter bags 9 since it tends to constantly align itself in a manner maintaining uniform contact between the pivoted supporting member 30 and the shaft supporting block 33 across the entire width of the knife-edge portion 31. This arrangement maintains essentially uniform load concentrations across the supporting member and the supporting block, thereby effectively minimizing wear and fatigue of the bearing components. Moreover, the inverted V-shaped construction of the shaft supporting block 33 prevents particulate materials from accummulating in the bearing assembly and forcing it out of alignment since if any materials do accummulate in the notch, they will be scrapped out by the knife-edge portion of the supporting member during normal shaking operations.

The embodiments of the invention in which an exclusive property or privilege is claimed are defined as follows:

1. In a baghouse having a housing defining a gas cleaning chamber, a horizontally extending shaker shaft mounted to support a plurality of bag-shaped filter elements within the gas cleaning chamber, and shaker drive and bearing means operatively connected to one end of the shaft for imparting rotational oscillation to the shaft to shake the filter elements during filter cleaning operations, wherein the improvement comprises a bearing assembly supporting the other end of the shaft, including:

stationary mounting means within the gas cleaning chamber;

a supporting member having an upwardly extending knife-edge portion generally aligned with the longitudinal axis of the shaft and pivotally connected to said mounting means for movement about a generally horizontal axis extending perpendicular to said axis of the shaft; and a shaft supporting block affixed to the shaft having an inverted V-shaped notch sized to be received on said knife-edge portion of the supporting member to accommodate rotational oscillation of the shaft during cleaning operations.

2. The baghouse of claim 1; and said stationary mounting means including a bracket affixed to the housing and a clevis secured to the bracket having a pair of upwardly projecting jaw portions; and pin means pivotally securing said supporting member between said jaw portions.

3. The baghouse of claim 1; and said shaft supporting block including a vertically extending base plate affixed to the shaft and an axially extending lug portion projecting from said base plate, said notch being formed in said lug portion.

4. The baghouse of claim 1; and the length of said inverted V-shaped notch being greater than the width of said knife-edge portion.

5. The baghouse of claim 1; and the apex of said inverted V-shaped notch being aligned along the longitudinal centroidal axis of the shaft.

6. The baghouse of claim 1; and said supporting member and said supporting block being formed of a metal casting.

* * * * *